July 4, 1967  T. C. F. STOTT  3,329,037
NOISE REDUCTION OF TOOTHED GEARS
Filed Sept. 9, 1965  6 Sheets-Sheet 1

Inventor
*Thomas Charles Felix Stott*
BY
*a. M. Neiter*
Attorney

July 4, 1967   T. C. F. STOTT   3,329,037
NOISE REDUCTION OF TOOTHED GEARS
Filed Sept. 9, 1965   6 Sheets-Sheet 2

Inventor
Thomas Charles Felix Stott
BY
a.m. Heiter
Attorney

July 4, 1967 T. C. F. STOTT 3,329,037
NOISE REDUCTION OF TOOTHED GEARS
Filed Sept. 9, 1965 6 Sheets-Sheet 3

Inventor
Thomas Charles Felix Stott
BY
a. M. Keiter
Attorney

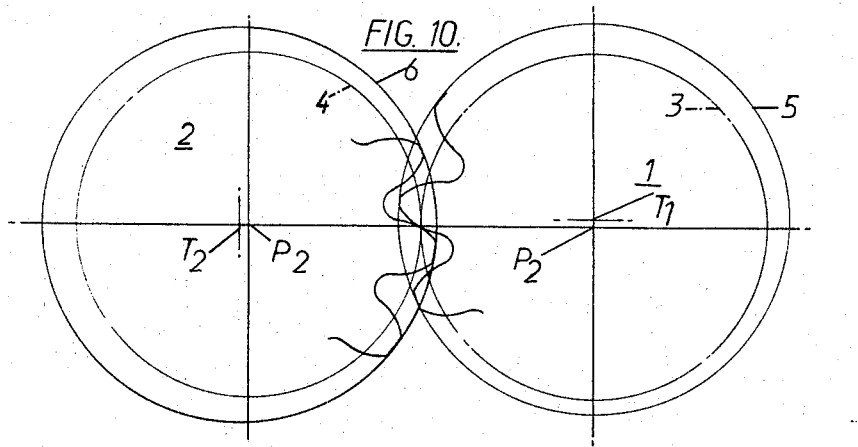
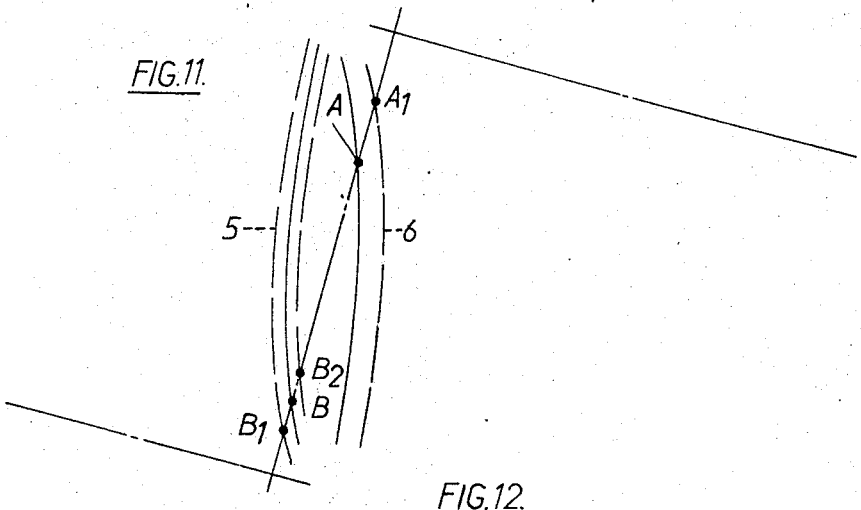
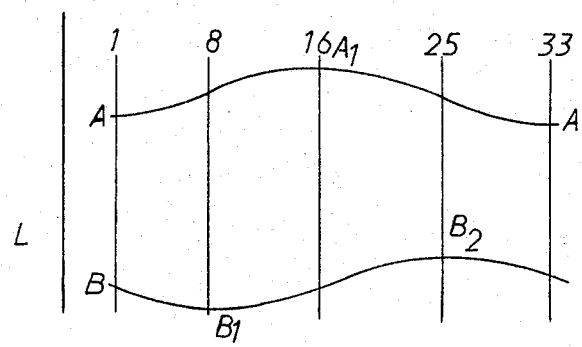

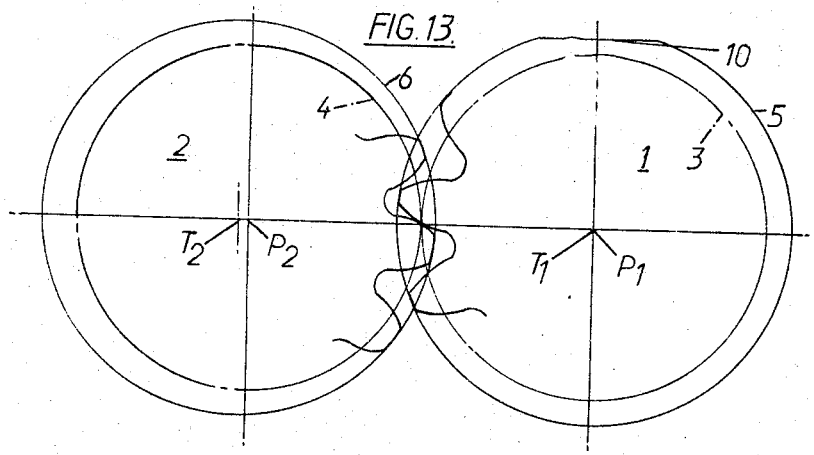
FIG. 13.
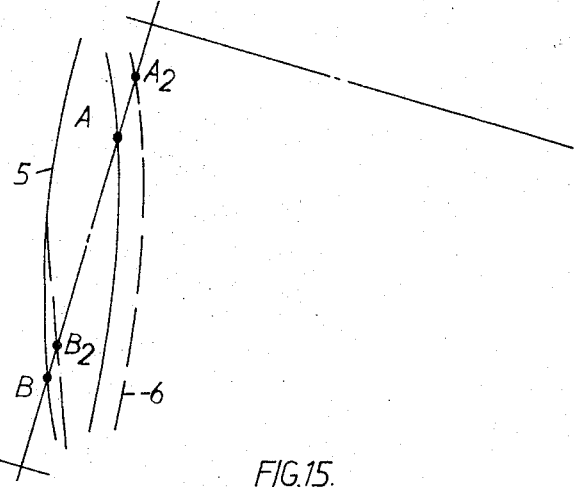
FIG. 14.
FIG. 15.
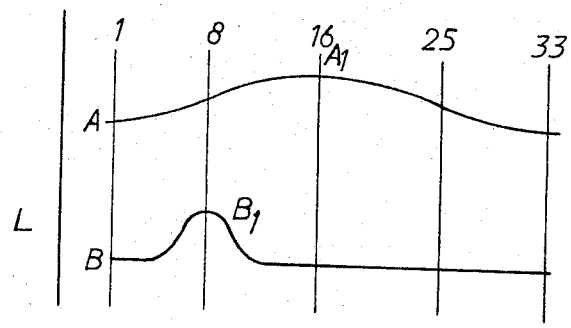

July 4, 1967  T. C. F. STOTT  3,329,037
NOISE REDUCTION OF TOOTHED GEARS
Filed Sept. 9, 1965  6 Sheets-Sheet 6
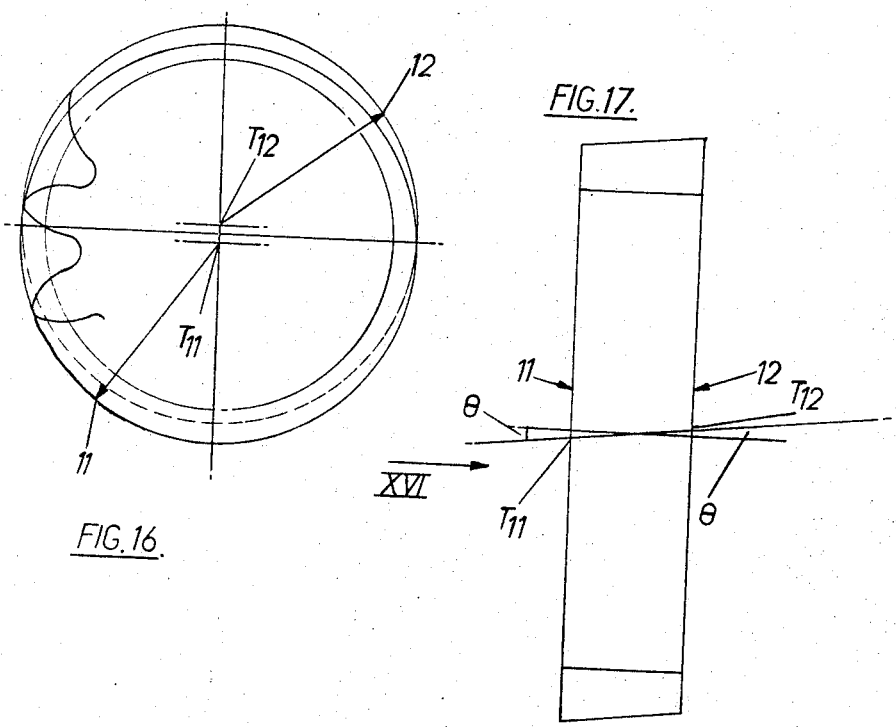
FIG.17.
FIG.16.
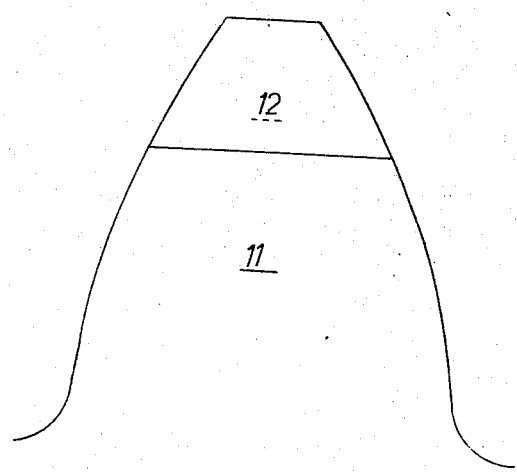
FIG.18.
Inventor
Thomas Charles Felix Stott
BY
a. M. Heiter
Attorney

United States Patent Office 3,329,037
Patented July 4, 1967

3,329,037
NOISE REDUCTION OF TOOTHED GEARS
Thomas Charles Felix Stott, Harpenden, England, assignor to General Motors Corporation, Detroit, Mich., a corporation of Delaware
Filed Sept. 9, 1965, Ser. No. 486,011
Claims priority, application Great Britain, Sept. 17, 1964, 37,990/64
11 Claims. (Cl. 74—437)

This invention relates to the noise reduction of toothed gears.

With the achievement of the accurate manufacture of what is considered the perfect tooth form and the consequent elimination of roughness, the presence of what is known as gear whine has become more apparent: its unmasking by the elimination of the noise of greater intensity has raised the secondary problem of its own reduction and elimination.

The cause of gear whine is two-fold: the consistency of the engagement and disengagement of the intermeshing teeth; and the natural frequency vibrations of the teeth circumferentially as a result of sequential engagement and disengagement of the intermeshing teeth.

The basis of the present invention is to break that consistency, and to modify the natural frequencies, while at the same time maintaining continuity of tooth action and smooth operation.

The invention, from one aspect, comprises an assembly of a pair of intermeshing toothed gears in which, for the reduction of noise, one of the gears has the centre of its tip circle eccentric of the common centre of its pitch and root circles so that the lengths of the lines of contact of successive pairs of interengaging teeth are varied.

From another aspect the invention comprises an assembly of a pair of intermeshing toothed gears in which, for the reduction of noise, both of the gears have the centres of their tip circles eccentric of the respective common centres of their pitch and root circles so that the points of engagement and disengagement on the lines of contact of successive pairs of interengaging teeth are varied.

The result is to produce variations in the lines of contact of successive pairs of interengaging teeth; and also varying the depths of the teeth, and consequently their natural frequencies.

The lines of contact can be varied either as to length, or as to the locations of the points of engagement and disengagement; or as to both length and location.

As will be apparent from the detailed description given hereinafter, both teeth of a pair can be made in this way.

As will also be apparent, the eccentricities of a pair of such teeth can be colinear, with the signs the same or opposite; or can be offset.

Further features of the invention will be apparent from the following detailed description with reference to the accompanying diagrammatic drawings in which:

FIGURES 10, 11 and 12 are respectively similar diagrams of a pair of such eccentric gears, but with their eccentricities offset instead of being colinear;

FIGURES 13, 14 and 15 are respectively similar diagrams of a pair of gears only one of which is eccentric, the other being modified; and FIGURES 16, 17 and 18 show modifications of the shapes of the teeth which can be effected.

In the various figures of the drawings like parts are indicated, where feasible, by the same reference numerals and letters.

Figure 1:
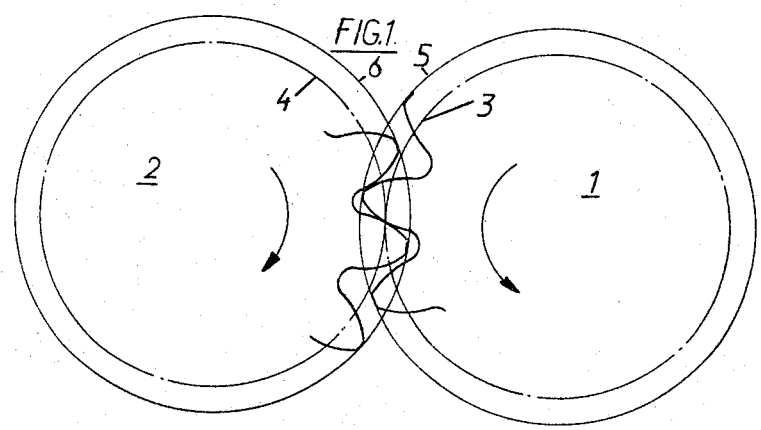
FIGURE 1 shows a conventional pair of intermeshing gears.
Figure 2:
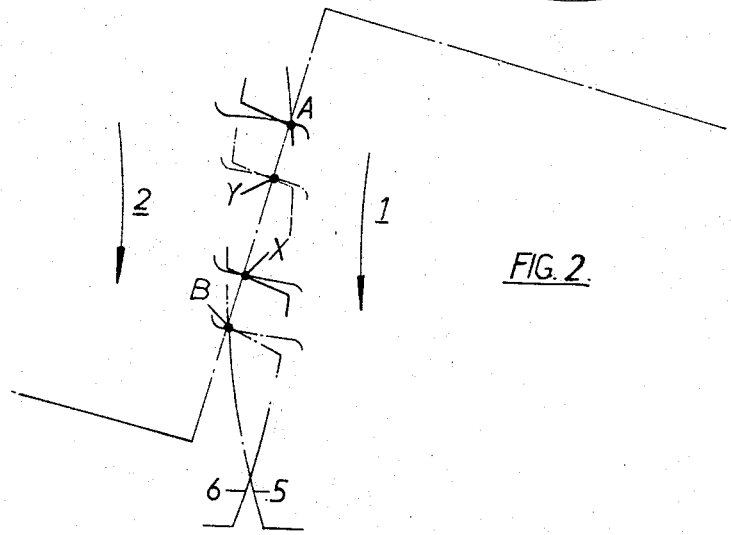
FIGURE 2 is an enlargement of the region of engagement of the teeth.

The pair of conventional gears shown in FIGURES 1 and 2 consist of a driver gear 1, and a driven gear 2. Driver gear 1 has a pitch circle 3, and a concentric tip circle 5; driven gear 2 has a pitch circle 4 and a concentric tip circle 6. Each gear has 33 teeth.

In the enlarged FIGURE 2 the uppermost shown tooth of driver gear 1 is just making contact at point A with a tooth of driven gear 2, and the preceding tooth of driver gear 1 is still in mesh with its complementary tooth of driven gear 2 at point X. As the gears rotate, the two latter teeth reach the point of disengagement B, at which time the point A has moved to position Y.

For continuity of action the length L of the path of contact AB must be greater than the base pitch $AX(=BY)$ which is the distance between adjacent teeth along that path. The ratio of the length of AB to the base pitch AX is the contact ratio.

As the teeth of both gears are identical within manufacturing tolerances, their natural frequencies of circumferential vibration are the same. Also the positions of the points of engagement (A) and disengagement (B) are the same, as each pair of teeth come into initial mesh.

Figure 3:
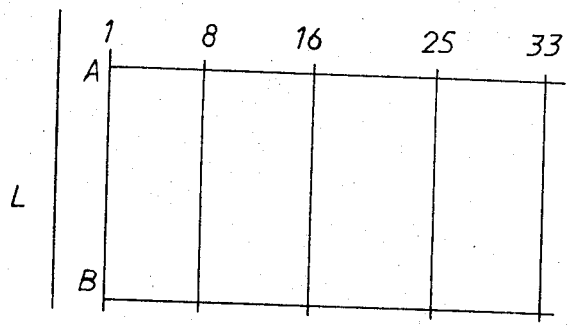
FIGURE 3 is a diagram of the path of contact, indicating its length and the location of its end points of engagement and disengagement.

As illustrated in the diagram of FIGURE 3, the length L of the path of contact AB (plotted vertically) is the same throughout the whole range of the 33 teeth (plotted horizontally).

Figure 4:
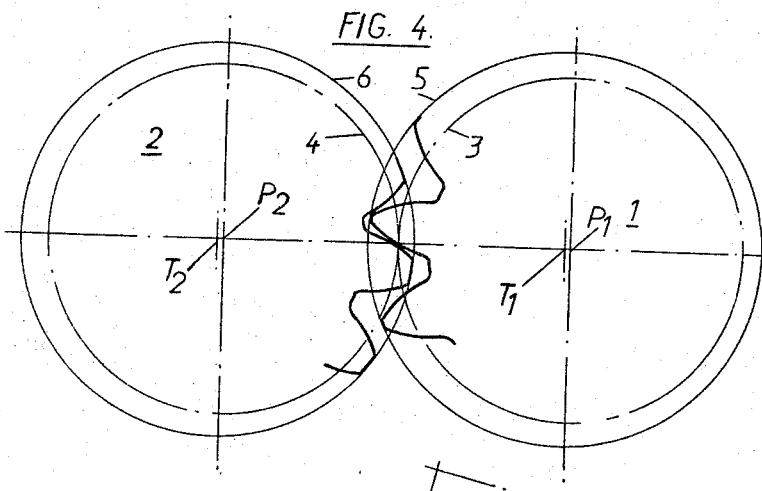
FIGURES 4, 5 and 6 are respectively similar diagrams of a pair of gears, both of which have eccentric tip circles of the same sign of eccentricity.
Figure 5:
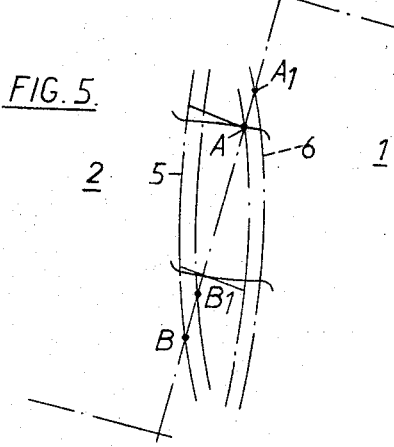
Figure 6:
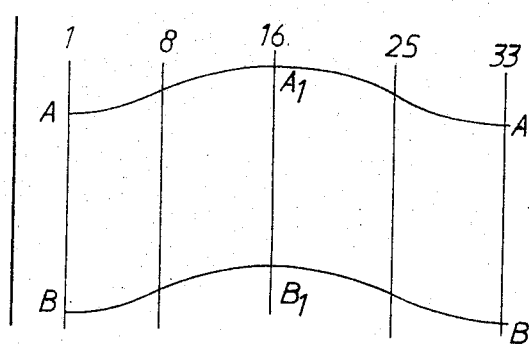

In the first of the exemplary embodiments of the invention shown in FIGURES 4 to 6, the two tip circles 5 and 6 of the driver gear 1 and driven gear 2 respectively are eccentric of the respective pitch circles 3 and 4; the offset centres $T_1$, $T_2$ are displaced from the pitch circle centres $P_1$, $P_2$ in the same direction—leftwards in FIGURE 4. The tooth of each gear consequently vary in depth, from a minimum at the right-hand ends of the horizontal diameters, to a maximum at the left-hand ends thereof, as shown in FIGURE 4.

In FIGURE 5 arcs of the minimum and maximum circles are shown in respect of each gear. Consequently the points of engagement vary from the position A to position $A_1$, and the points of disengagement vary from position $B_1$ to position B. The lengths L of the paths of contact remain constant: AB and $A_1B_1$.

This is shown diagrammatically in FIGURE 6 where the vertical distances AB, $A_1B_1$ are constant, but the positions of the points A, $A_1$; B, $B_1$ vary around the gears.

Figure 7:
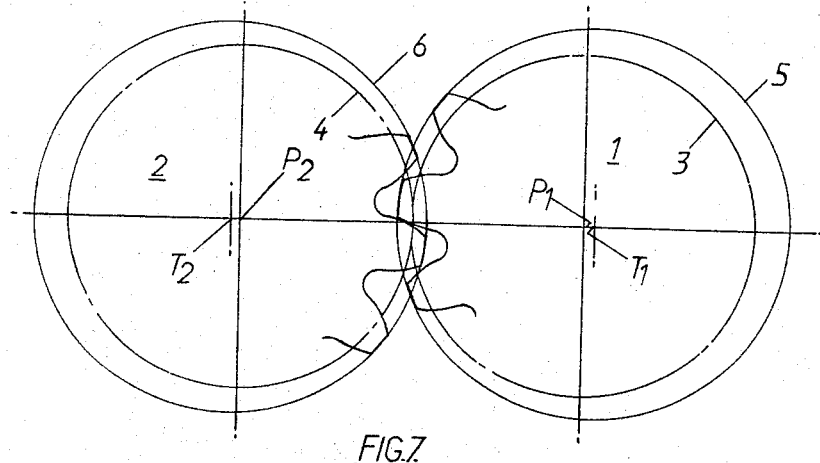
FIGURES 7, 8 and 9 are respectively similar diagrams of a pair of gears, both of which have eccentric tip circles but of opposite sign.
Figure 8:
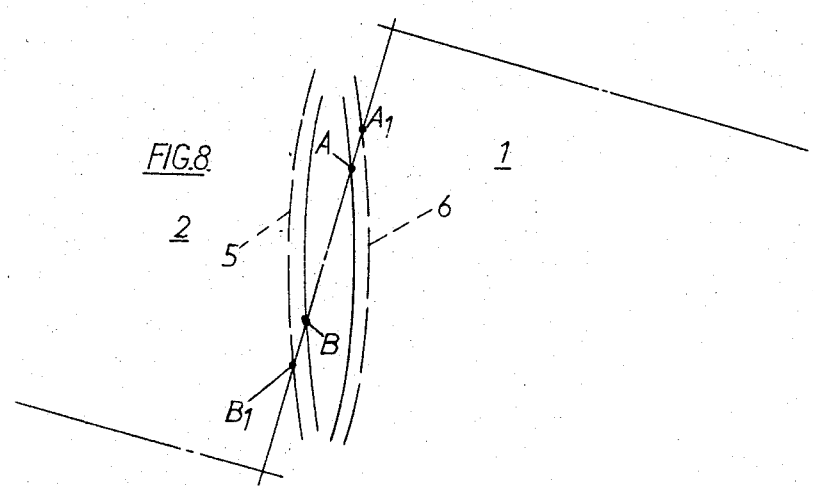
Figure 9:
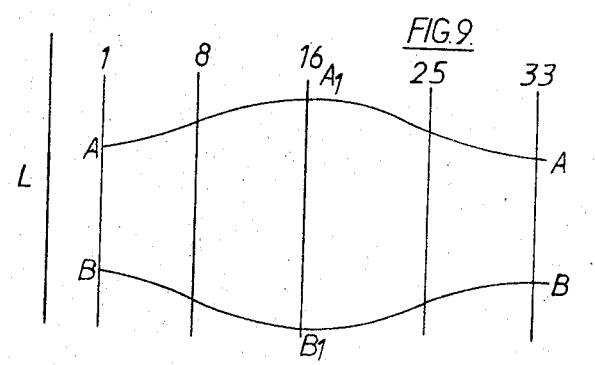

The second embodiment shown in FIGURES 7 to 9 differs from the first in that both gears 1 and 2 have similar eccentric tip circles 5, 6, relative to their pitch circles 3, 4, the respective tip circle centres $T_1T_2$ are offset in opposite directions relative to the pitch circle centres $P_1$, $P_2$: rightwards for gear 1 and leftwards for gear 2.

The result is seen in FIGURE 9. By comparing it with FIGURE 6 it will be seen that both the lengths of the paths of contacts AB, $A_1B_1$ and also the positions of points A, $A_1$ and B, $B_1$ vary. The wavy lines in FIGURE 6 are "in phase"; whereas in FIGURE 9 they are "out of phase."

In the third embodiment shown in FIGURES 10 to 12, both the gears 1 and 2 again have eccentric tip circles; but instead of having their tip circle centres $T_1$, $T_2$ colinear, one is offset relative to the other: in driver gear 1 shown in FIGURE 10 the centre $T_1$ is above the horizontal line joining the other centres.

The result is shown in FIGURES 11 and 12: the length L of the path of contact varies as the gears rotate; and the positions of the points A, $A_1$; B, $B_1B_2$, vary, out of phase relative to one another.

In the fourth embodiment shown in FIGURES 13, 14, 15, only the driven gear 2 has an eccentric tip circle 6 with its centre $T_2$. The driver gear 1, however, has the tips of some of the teeth flattened as at 10 (FIGURE 13). This produces a transient variation of the length of the path of contact, as shown in the lower line of FIGURE 15, which is otherwise straight because of the concentricity of the circles of driver gear 1. The upper line of FIGURE 15 is of the same shape as those of FIGURES 6, 9 and 12.

All of the teeth of the gears above described are cut in the conventional way which is not affected by the machining of the outer surface of the blanks to an eccentric or other shape.

Preferably involute teeth are used, which normally produce relatively quiet operation. However, the invention can be used for cycloidal teeth.

An alternative of or a supplement to the above-described methods and constructions is illustrated in FIGURES 16, 17, 18 where a single gear is shown in end face in FIGURE 16 in the direction of arrow XVI in FIGURE 17 which itself is a transverse view of the gear. FIGURE 18 is an enlarged end view of a single tooth.

This construction is produced by cutting the teeth in the conventional manner, that is with the root parallel to the axis of the gear but additionally with the outside diameter turned on an axis which is set at an angle $\theta$ to the axis of the gear, as shown in FIGURE 17.

Thus the face 11 has an eccentric tip circle centre $T_{11}$, and face 12 has a similar but relatively offset centre $T_{12}$. In operation, as will be clear from FIGURE 18, the point of application of the load on each tooth as it engages its complementary tooth on the other gear moves along the tooth from the long-tooth face to the short-tooth face, vice versa.

I claim:

1. A gear assembly comprising a pair of intermeshing toothed gears in which, for the reduction of noise, one of the gears has the centre of its tip circle eccentric of the common centre of its pitch and root circles so that the lengths of the lines of contact of successive pairs of interengaging teeth are varied.

2. A gear assembly according to claim 1, in which the eccentric tip circle centre of the one gear is colinear with the common centre of its pitch and root circles and with the common centre of all the circles of the other gear.

3. A gear assembly according to claim 2 in which one of the gears has the tips of some of its teeth flattened so as to produce transient variations of the lengths of the paths of contact with its mating teeth.

4. A gear assembly according to claim 1, in which the eccentric tip circle centre of the one gear is offset from the common line of centres of its pitch and root circles and of the common centre of all the circles of the other gear.

5. A gear assembly according to claim 1, in which one of the gears has the tips of some of its teeth flattened so as to produce transient variations of the lengths of the paths of contact with its mating teeth.

6. A gear assembly comprising a pair of intermeshing toothed gears in which, for the reduction of noise, both of the gears have the centres of their tip circles eccentric of the respective common centres of their pitch and root circles so that the points of engagement and disengagement on the lines of contact of successive pairs of interengaging teeth are varied.

7. A gear assembly according to claim 6, in which eccentric dispositions of the two tip circle centres are offset in the same direction from their respective common centres of their pitch and root circles.

8. A gear assembly according to claim 6 in which the eccentric dispositions of the two tip circle centres are offset in opposite directions from their respective common centres of their pitch and root circles.

9. A gear assembly comprising a pair of intermeshing gears in which for the reduction of noise one of the gears has the outside diameter of its teeth cut at an angle to the axis of the gear so that one face of the gear has an eccentric tip circle centre and the other face has a similar but relatively offset tip circle centre.

10. A gear assembly comprising a pair of intermeshing toothed gears in which, for the reduction of noise, both of the gears have the centres of their tip circles eccentric of the respective common centres of their pitch and root circles so that the points of engagement and disengagement on the lines of contact of successive pairs of interengaging teeth are varied and are in phase, and the lengths of the paths of contact are the same.

11. A gear assembly comprising a pair of intermeshing toothed gears in which, for the reduction of noise, both of the gears have the centres of their tip circles eccentric of the respective common centres of their pitch and root circles so that the points of engagement and disengagement on the lines of contact of successive pairs of interengaging teeth are varied, but are out of phase and the lengths of the paths of contact are different.

References Cited

UNITED STATES PATENTS 3,241,392   3/1966   Hardy _____ 74—443 X

ROBERT M. WALKER, *Primary Examiner.*

L. H. GERIN, *Assistant Examiner.*